TELEVISION RECEIVER SYNCHRONIZING APPARATUS

Filed Jan. 25, 1968 3 Sheets-Sheet 1

INVENTORS D. C. FISK
A. M. GORDON
BY Gerard E. Murphy
ATTORNEY

TELEVISION RECEIVER SYNCHRONIZING APPARATUS

Filed Jan. 25, 1968 3 Sheets-Sheet 2

Sept. 1, 1970 D. C. FISK ET AL 3,526,714

TELEVISION RECEIVER SYNCHRONIZING APPARATUS

Filed Jan. 25, 1968 3 Sheets-Sheet 3

United States Patent Office 3,526,714
Patented Sept. 1, 1970

3,526,714
TELEVISION RECEIVER SYNCHRONIZING APPARATUS

David C. Fisk, Laurence Harbor, and Alan M. Gordon, Matawan Township, Monmouth County, N.J., assignors to Bell Telephone Laboratories, Incorporated, Murray Hill and Berkeley Heights, N.J., a corporation of New York Filed Jan. 25, 1968, Ser. No. 700,575
Int. Cl. H04n 5/04
U.S. Cl. 178—69.5 9 Claims

ABSTRACT OF THE DISCLOSURE

In order to generate synchronizing signals for a video receiver, a source of pulse signals, phase-locked to incoming horizontal timing signals, drives a plurality of binary counters, the number, N, of which is intimately related to the number of lines per frame in a raster display. A signal is generated upon the simultaneous occurrence of a predetermined energy state in the N counters. The generated signal inhibits a predetermined number, *i*, of the N counters and simultaneously initiates vertical retrace. A gating network prevents the application, by the source, of subsequent pulses to the uninhibited counters unless there is also present at the receiver, a received vertical timing signal. Upon the occurrence of a received vertical timing signal, pulses are again applied to the counters to complete the vertical retrace period. Simultaneously, horizontal synchronizing signals are developed by divider apparatus responsive to the signals of the driving source.

BACKGROUND OF THE INVENTION

Field of the invention

This invention pertains to apparatus for generating timing signals and, more particularly, to apparatus for generating timing signals for video communications systems.

As is well known, the quality and accuracy of a reproduced video scene, at a receiver, is intimately related to the degree of correspondence between the relative physical positions of the scanning electronic beams at transmitter and receiver. It is, therefore, imperative that the periodicity and phase of the horizontal and vertical beam positioning control signal be substantially identical at both transmitter and receiver. The control signal, generally identified as a synchronizing (sync) signal, is usually composed of two parts, a horizontal (sync) timing signal and a vertical (sync) timing signal. The general practice is to make the transmitter timing generator, which develops the above timing control signals, the fundamental timing unit of the entire system. Thus, the signals generated at the transmitter govern the scanning pattern at both transmitter and receiver. It is, therefore, extremely important that the apparatus used to generate the scanning signals at the receiver faithfully reproduce the incoming synchronization information.

Description of the prior art

Conventionally, the well-known synchronized blocking oscillator has been used as a source of pulse voltage for developing scanning signals in television receivers. A typical system is described on page 735 of Television—The Electronics of Image Transmission in Color and Monochrome, authored by Zworykin and Morton (John Wiley & Sons, 1954, second edition). The blocking oscillator suffers from a number of disadvantages; e.g., it is well known that random noise and other forms of spurious interference may cause undesirable triggering of the oscillator with a consequential loss in synchronization.

Furthermore, conventional pulse generation techniques require the continuous application of driving signals in order to function, i.e., they are not free-running in the absence of applied sync signals. In closed circuit television systems, on the other hand, loss of driving sync is a common occurrence whenever one of a plurality of locally situated transmitters is activated in lieu of another one of the transmitters. Thus, the use of conventional techniques for reproducing the received video timing signals gives rise to problems which are severely detrimental in systems which must necessarily operate for extended intervals of time without mishap.

SUMMARY OF THE INVENTION

It is, therefore, an object of this invention to generate video timing signals without recourse to the use of conventional blocking oscillators.

It is another object of this invention to substantially lessen the susceptibility to noise interference exhibited by conventional video timing apparatus.

It is yet another object of this invention to generate video control signals at a receiver regardless of whether or not an incoming video signal is present.

In accordance with the principles of this invention, these and other objects are accomplished by utilizing timing apparatus driven by a pulse oscillator which is phase locked to incoming horizontal sync signals. More particularly, a phase-locked source of pulse signals drives a plurality of binary counters, the number, N, of which is intimately related to the number of lines per frame in a raster display. A signal is generated upon the simultaneous occurrence of a predetermined energy state in the N counters or multivibrators. The generated signal inhibits a predetermined number, *i*, of the N multivibrators and simultaneously initiates vertical retrace. A vertical gating network prevents the application, by the source, of subsequent pulses to the uninhibited multivibrators, $N-i$, unless there is also simultaneously present at the receiver a received vertical sync signal. In the absence of a received vertical sync signal, the generation of signals by the timing apparatus is "frozen" until a vertical sync pulse occurs. Upon the occurrence of a vertical sync pulse, pulses are again applied to the uninhibited multivibrators until they again attain a predetermined energy state. At this juncture, inhibition of the *i* counters is terminated and all of the multivibrators are returned to their initial energy state. Vertical retrace is simultaneously terminated and the apparatus is prepared to initiate a new field. Thus, the total number of half lines in each field is $2^N-1$ active lines and $2^{N-i}$ retrace lines. In addition, because of the mathematical relationship between the signal frequency of the driving pulse oscillator and the total number of lines per frame, proper interlace of the scanning signals is insured.

Therefore, because the driving pulse oscillator is phase locked to the incoming horizontal sync signals and the generation of the receiver vertical sync signals is locked to the incoming vertical sync pulses complete receiver-transmitter synchronization is accomplished. Furthermore, proper operation of the apparatus of this invention requires that a vertical sync pulse be received within a predetermined short interval of time. Since the timing apparatus will only be affected during this interval of time, impulse noise or other spurious interference will have no effect on the generation of accurately timed sync pulses unless the noise occurs during the relatively short interval of time, which is highly improbable.

These and further features and objects of this invention, its nature and various advantages, will become apparent upon the consideration of the attached drawings and of the following detailed description of the drawings.

DETAILED DESCRIPTION OF THE INVENTION

Figure 1:
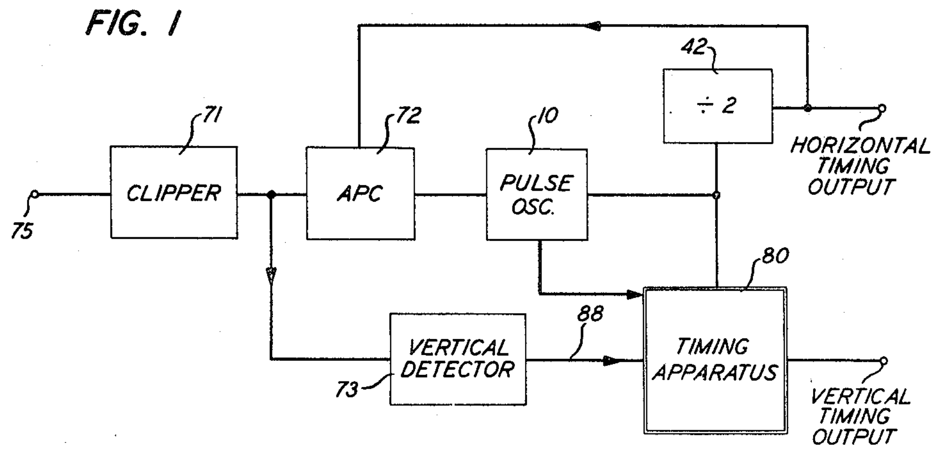
FIG. 1 is a block diagram of the video synchronization system of this invention.

FIG. 1 is a block diagram of the receiver synchronizing apparatus of this invention. A received composite video signal is applied to input terminal 75 of clipper 71 which extracts the synchronizing (sync) signal, superimposed on the video information signal, in a manner illustrated by waveforms F and G of FIG. 3. The extracted synchronizing signal is applied to automatic phase control (APC) circuit 72 and to vertical detection circuit 73. Detection circuit 73 develops a control signal, on line 88, each time a received vertical sync pulse is present at its input terminal. The control signal is applied to timing apparatus 80, more particularly illustrated in FIG. 4, which will be discussed in detail hereinafter. Apparatus 80 responds to the applied control signal by developing a vertical synchronizing signal for the scanning beam of the receiver display tube (not shown).

Oscillator 10 generates pulse signals of a frequency twice that of the desired horizontal scanning rate. Apparatus 42 divides the signal frequency of oscillator 10 by a factor of two to develop the desired horizontal sync signals for the scanning beam of the receiver display tube. The generated pulse signals of oscillator 10 are also simultaneously applied to apparatus 80 to assist in the generation of the vertical sync signal.

APC circuit 72, which is jointly responsive to the input sync signals emanating from clipper 71 and to the horizontal sync signals developed by apparatus 42, compares the input sync signals with the locally generated horizontal sync signals and develops a signal proportional to their phase difference. The error signal developed, if any, is used to alter the signal frequency of oscillator 10, thus insuring that the horizontal output and input sync signals are identical in frequency, i.e., that they are locked together. APC circuit 72 may be of any construction well known to those skilled in the art.

Figure 2:
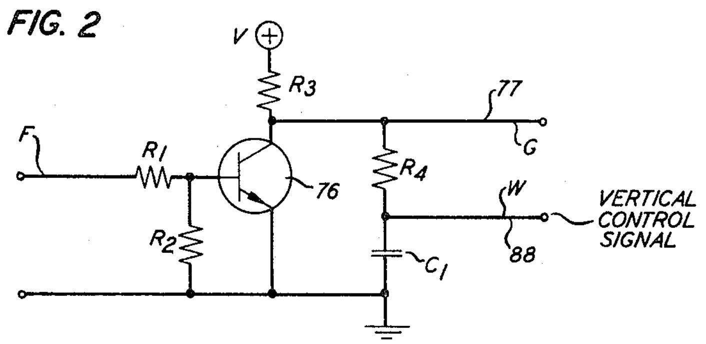
FIG. 2 is a schematic diagram of a combined clipper-vertical detection circuit used in this invention.
Figure 3:
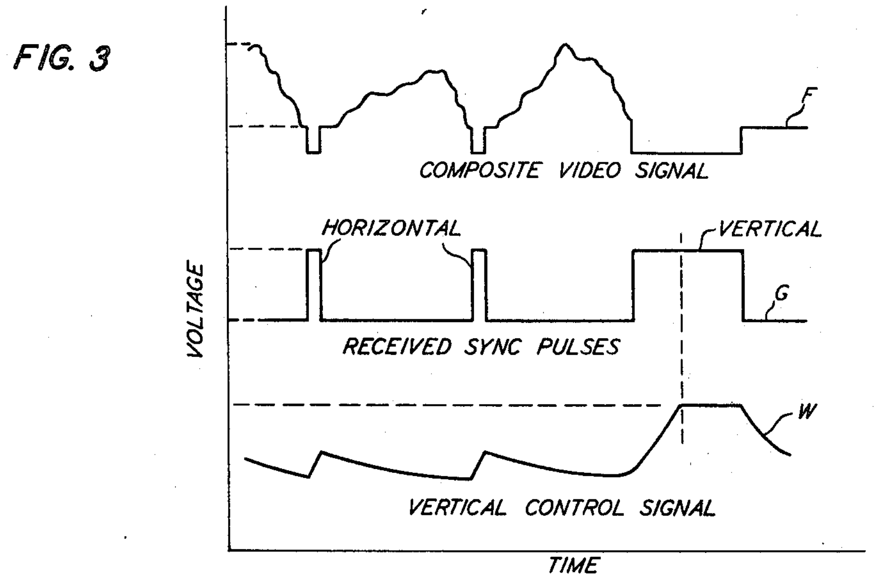
FIG. 3 depicts various signal waveforms generated by the circuit of FIG. 2.

FIG. 2 is a schematic diagram of a combined clipper-vertical detection circuit which performs the functions of apparatus 71 and 73 of FIG. 1. Input resistors $R_1$ and $R_2$ serve as a voltage divider and determine the clipping level, in conjunction with the input threshold level of transistor 76. Transistor 76 is normally biased on by the applied composite video signal illustrated by waveform F of FIG. 3. The occurrence of a sync pulse, either horizontal or vertical, causes the base voltage of transistor 76 to fall below its threshold level, thus turning the transistor off. The collector voltage of transistor 76, waveform G of FIG. 3, therefore rises to a predetermined level, determined by the collector supply voltage, V, collector resistor $R_3$, and the load impedance connected to the collector. At the termination of a sync pulse, the input signal again exceeds the threshold level of transistor 76 and thus causes it to conduct. A train of extracted sync pulses, illustrated by waveform G of FIG. 3, is therefore developed and is applied to APC circuit 72 (FIG. 1) via line 77.

The signal developed at the collector of transistor 76 is also supplied to serially connected resistor $R_4$ and capacitor $C_1$ which serve as an integrating network. By selecting the values of resistor $R_4$ and capacitor $C_1$, in a well-known manner, the occurrence of a vertical sync signal will be indicated on line 88 whenever the capacitor $C_1$ voltage attains a predetermined level, as illustrated by waveform W of FIG. 3. The vertical sync indication or control signal appearing on line 88 is applied to apparatus 80 (FIG. 1) which is further illustrated in FIG. 4.

Figure 4:
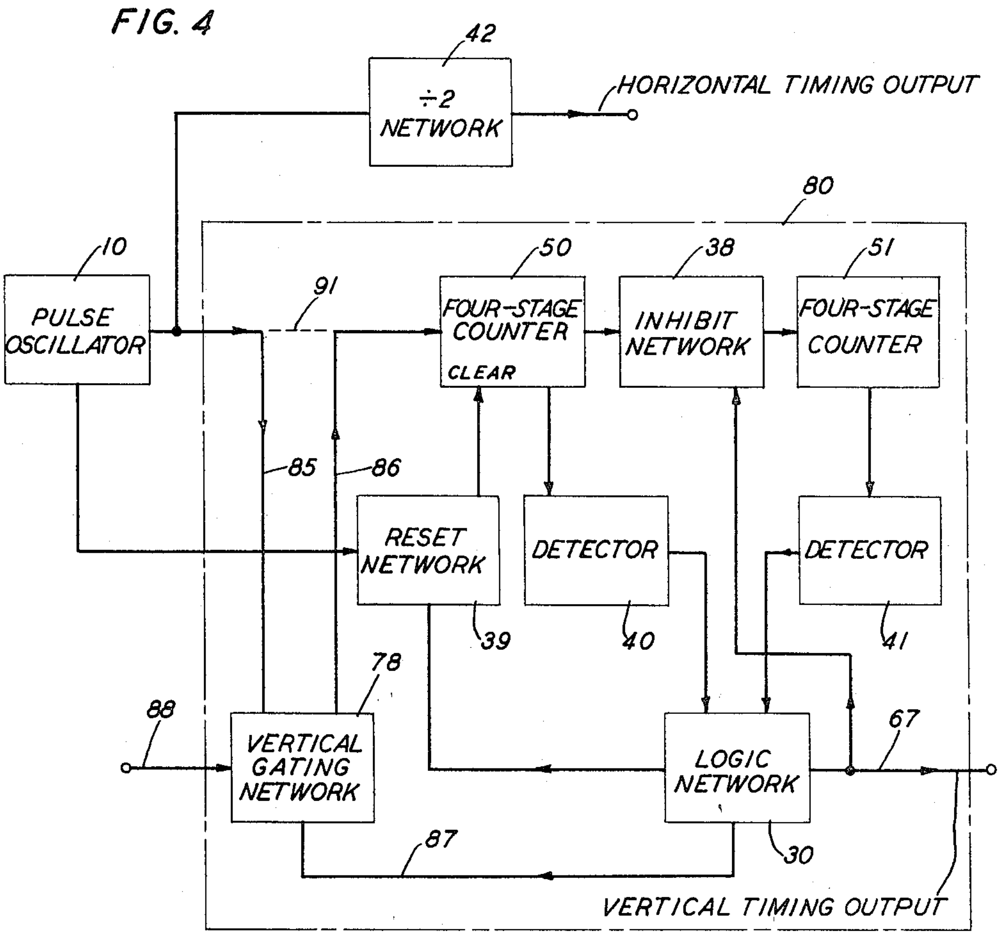
FIG. 4 is a block diagram of the timing apparatus of this invention.

In the apparatus illustrated in FIG. 4, pulse oscillator 10, for example, a multivibrator, generates pulse signals of a frequency twice that of the desired horizontal scanning frequency. Apparatus 42, which is responsive to the generated signals of oscillator 10, divides the applied signal frequency by a factor of two to develop the desired horizontal sync signals. Apparatus 10 and 42 correspond to the identically designated apparatus in FIG. 1; the remainder of the illustrated apparatus corresponds to timing apparatus 80 of FIG. 1. The signals generated by oscillator 10 drive a predetermined number, N, of stages of a counter which, for illustrative purposes and the following description, will be considered to comprise two four-stage counters, 50 and 51, coupled by an inhibit network 38.

As discussed in the copending application of W. B. Cagle and A. M. Gordon, entitled "Television Timing Signal Generator," filed of even date herewith (W. B. Cagle—A. M. Gordon 7–6), in order to achieve proper interlace of successive video fields, the vertical sweep frequency must be equal to twice the horizontal sweep frequency divided by the number, *n*, of lines per frame. As in the above copending application, it will be assumed that the number of lines per frame is equal to 271; thus, it is necessary to divide the output signal frequency of oscillator 10 by a factor of 271, in order to obtain the desired vertical signal frequency. Of course, the principles of this invention are generally applicable and are not limited to the specific illustrative parameters described herein.

Division is accomplished, while maintaining the proper interlace relationship, by the cooperation of counters 50 and 51 and logic network 30. Assuming that inhibit network 38 is not enabled, i.e., not inhibiting, and for illustrative purposes that lines 85 and 86 are bridged by line 91, then the combined eight-stage counter, comprising counters 50 and 51, will respond to the output pulses of oscillator 10 in a normal fashion. If each of the stages of the counter is reset, for example, to a predetermined LOW energy state, then after the application of 255 pulses from oscillator 10, the eight stages of the counter will have attained, e.g., a predetermined HIGH energy state. (The terms "LOW" and "HIGH" simply refer to the arbitrary designation of the potential of an output terminal of each of the counter stages.) Since the oscillator 10 signal frequency is twice that of the desired horizontal line frequency, 255 pulses will correspond to 127½ scanned lines. Thus, at this juncture the beam of a receiver display tube, responsive to the signals developed by apparatus 42, will have scanned 127½ lines. Detectors 40 and 41 and logic network 30 respond to the HIGH energy condition of the combined counter by generating a vertical timing (sync) pulse on line 67, which is used to initiate vertical retrace, and an auxiliary timing signal on line 87. The auxiliary timing signal corresponds to the abbreviated vertical sync signal described in the above cited copending application. Simultaneously, the vertical sync pulse emanating from logic network 30 enables inhibit network 38 which open circuits the conductive path connecting four-stage counters 50 and 51. Thus, assuming that gating network 78 is not interposed between lines 85 and 86, i.e., that they are bridged by line 91, the four-stages of counter 50 continue to respond to the output pulses of oscillator 10, while the four-stages of counter 51 remain in their previous HIGH state. After sixteen pulses have been received by counter 50, each stage thereof will again have attained a HIGH energy state. This condition is detected by apparatus 40, triggering logic network 30 which terminates the vertical timing pulse on line 67, therefore initiating active vertical sweep once again. Thus, after an additional sixteen pulses from oscillator 10, corresponding to eight scanned lines, a field will have been completed comprising a total of 127½ active scanned lines and eight retrace lines. To commence the second field of the frame, reset network 39, which is activated by logic network 30 at the termination of the vertical timing pulse, detects the next change in phase of the output signal of oscillator 10. Since only every other change in phase of the pulse output of oscillator 10 activates counter 50, sufficient time is allowed for apparatus 39 to activate the "clear" input of the first stage of counter 50. At the termination of the vertical timing pulse, inhibit network 38 is disabled and, since both counters, 50 and 51, are in a HIGH state, the combined eight stages will be reset to a LOW state by activation of the "clear" input of the first stage of counter 50. Thus, the counters are returned to their initial state to commence the second field of the frame in an identical manner to that described above. A full frame will thus comprise 255 (2×127½) active scan lines and 16 (2×8) retrace lines, yielding a total of 271 lines per frame which are properly interlaced. With the exception of vertical gating network 78, a more detailed description of apparatus 80 may be found in the above identified copending application.

In accordance with this invention, a vertical gating network 78 is inserted in the path between pulse oscillator 10 and counter 50, in lieu of the illustrated direct connection of line 91, to assure that the generation of the receiver vertical timing (sync) signal corresponds to the occurrence of a received vertical sync pulse.

Thus, a conventional vertical oscillator, commonly used in video systems, with all of its disadvantages of intermittent loss of synchronization and noise susceptibility, need not be used. Furthermore, another advantage of this invention is that, with slight modification, apparatus 80 may be used either as a receiver timing generator, as illustrated, or as a transmitter timing generator similar to that disclosed in the above identified copending application.

Vertical gating network 78, responsive to the vertical control signals developed by detector 73 of FIG. 1, allows the first 255 pulses of oscillator 10 to be applied to counter 50, as discussed above. After 255 pulses have been applied to the counter chain, detectors 40 and 41 and logic network 30 respond to the HIGH energy condition of the counter by generating a vertical sync pulse on line 67. The vertical sync pulse inhibits network 38 as described above. However, vertical gating network 78 prevents the application by oscillator 10, of subsequent pulses to counter 50 unless there is also simultaneously present at the receiver a received vertical sync pulse, the presence of which is indicated by a vertical control signal on line 88.

In the absence of such a control signal, the generation of timing signals by apparatus 80 is "frozen" until a vertical control signal occurs. Therefore, since pulse oscillator 10 is locked to the incoming horizontal sync pulses by APC circuit 72 (FIG. 1) and since the generation of the receiver vertical sync signals is locked to the incoming vertical sync pulses, complete receiver-transmitter synchronization is accomplished.

Assuming that a vertical control signal is present on line 88, the conductive path between oscillator 10 and counter 50 is completed and timing apparatus 80 functions, as above, to generate recurring sync signals at the receiver. Thus, the four stages of counter 50 continue to respond to the output pulses of oscillator 10, while the four-stages of counter 51 remain in their previous HIGH state. After sixteen pulses have been received by counter 50, the locally generated vertical sync pulse will be terminated, therefore initiating active vertical sweep once again. As described above, the counter chain will be cleared to commence the second field of the frame.

It should be noted that during the generation of the first field, the locally generated vertical sync pulse is stretched in time by an amount equal to the interval required for a vertical control signal to occur. However, since apparatus 80 is enabled following the receipt of a vertical control signal, the next vertical sync pulse generated by apparatus 80 will be in phase with the received vertical sync pulse of the incoming signal since synchronization is assured by APC circuit 72 of FIG. 1.

Figure 5:
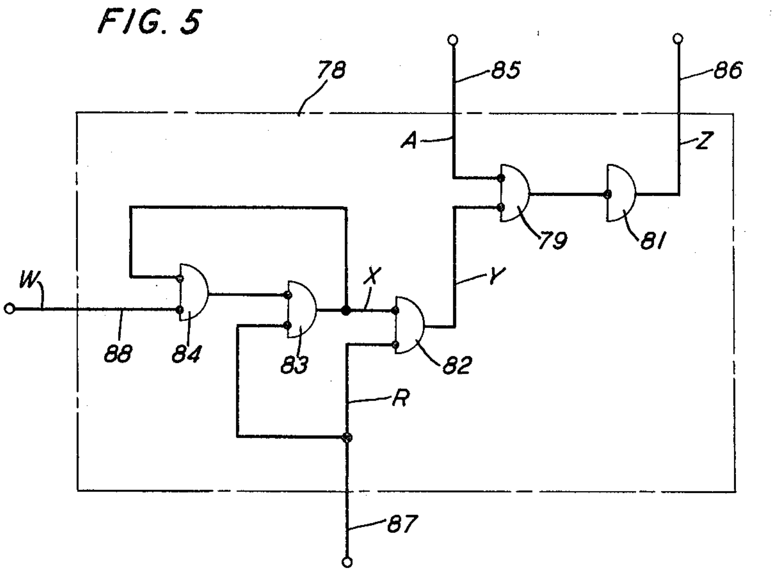
FIG. 5 is a schematic diagram of the vertical gating network used in the timing apparatus of this invention.
Figure 6:
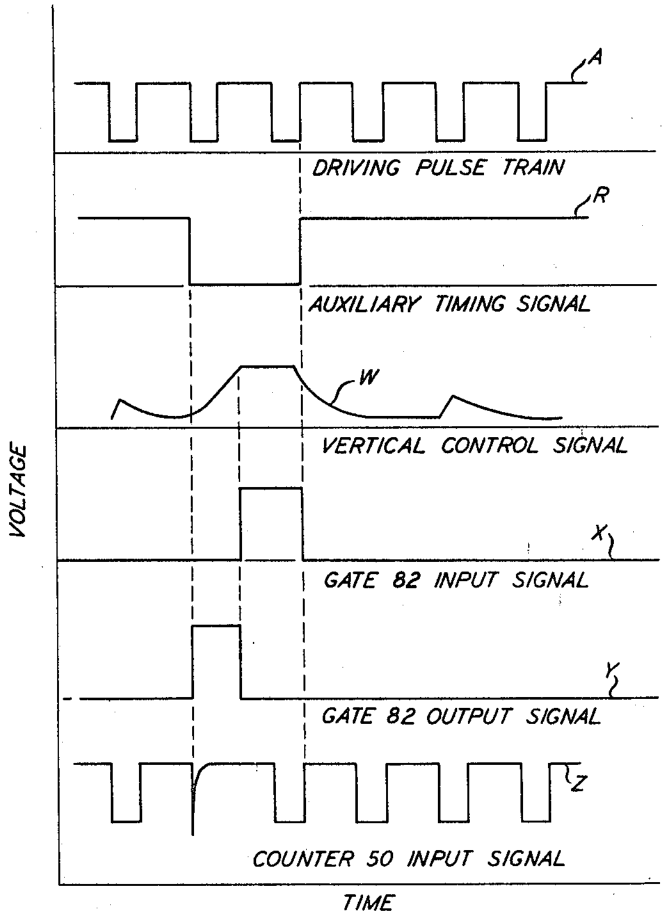
FIG. 6 illustrates the waveforms of signals generated by the timing apparatus of this invention.

A detailed illustration of vertical gating network 78 may be found in FIG. 5. Lines 85 and 86 connect oscillator 10 and counter 50 to gating network 78, as shown in FIG. 4. The pulse train developed by oscillator 10, which appears on line 85, illustrated as waveform A of FIG. 6, is one of the inputs to transmission gate 79. The other input to gate 79 comprises the output signal of gate 82, depicted by waveform Y of FIG. 6. If waveform Y is LOW, gate 79 will be enabled and simply act as an inverter. Gate 81, in turn will invert the signal output of gate 79 and develop waveform Z, FIG. 6, which is substantially identical to the signal developed by oscillator 10, waveform A. Counter 50 of FIG. 4 will be enabled by the pulses applied by oscillator 10 and apparatus 80 will continuously recycle in a "free-running" manner. Thus, the condition of output signal Y of gate 82 controls the operation of timing apparatus 80. Therefore if output signal Y is made permanently LOW by grounding, e.g., the output of gate 82, the apparatus will function as a transmitter timing generator. One input to gate 82 is the auxiliary timing pulse signal developed on line 8 by network 30 of FIG. 4 (waveform R of FIG. 6). The appearance of an auxiliary timing pulse indicates that counters 50 and 51 have received 255 pulses from oscillator 10 and that each stage of the counters is in a HIGH state. In the absence of a vertical control signal, waveform W of FIG. 6, on line 88 from detector 73 of FIG. 1, one of the input signals to gate 82, X, is LOW since the input W to gate 84 is LOW. Also, since input R to gate 82 is LOW, output Y is HIGH. As indicated in FIG. 6, waveform A is simultaneously LOW. Thus, the output of gate 79 is LOW and the output of gate 81 is HIGH, inhibiting further action by counter 50 of FIG. 4. Counter 50 will thus not respond in the absence of a received vertical sync signal; timing apparatus 80 is therefore "frozen" until a vertical sync pulse is received.

The receipt of a vertical sync pulse has the effect of making line 88 HIGH (waveform W). A HIGH input on line 88 causes the input, X, to gate 82 to become HIGH. Since the other input to gate 82, waveform R, is still LOW, output Y also becomes LOW and enables gate 79. Thus, counter 50 may again respond to the pulses generated by oscillator 10.

As another feature of this invention, in the total absence of a received video signal the input to the circuit of FIG. 2, waveform F, will be constantly LOW with the result that waveform W will be continually HIGH. Thus the timing apparatus will continue to function in a "free-running mode," and a raster will be displayed, if so desired, in the absence of a received signal. The trailing edge of the first pulse applied to counter 50, after gate 79 is enabled, propagates through counter 50 and terminates the auxiliary timing pulse. Thus, input R to gate 82 becomes HIGH, signal Y remains LOW, and the sequence of operations described above will continue until counter 50 receives a total of sixteen pulses, whereupon the counter chain will be cleared and a new field will commence.

Thus, before steady state operation can occur, pulse oscillator 10 must be locked to the incoming horizontal sync pulses and timing apparatus 80 must be restarted from its "frozen" condition by the presence of a received vertical sync pulse. The next received vertical sync pulse will necessarily be coincident with the development of a vertical sync pulse by the receiver, and no delay between the generation of a local vertical synchronizing signal and the received synchronizing signal will occur, with the exception of an inconsequential constant phase error introduced by APC circuit 72 of FIG. 1.

Proper operation thus requires only that a vertical sync pulse be received within an interval of time defined by the termination of a LOW output pulse of oscillator 10 and the termination of the locally generated auxiliary timing pulse, waveform R. Since the timing apparatus will only be affected during this interval, impulse noise will have no effect on the generation of accurately timed sync pulses unless it occurs during this relatively short interval of time, which is highly improbable. If, however, a vertical sync signal is not received during the proper interval, signal Y will remain HIGH and counter 50 will be disabled until a vertical sync signal does arrive (presumably one field later in time).

It is to be understood that the embodiments shown and described herein are illustrative of the principles of this invention only and that further modifications of this invention may be implemented by those skilled in are art without departing from the scope and spirit of the invention. For example, the apparatus described in conventional discrete circuit component terminology may also lend itself to implementation by integrated circuit technology.

What is claimed is:

1. Television apparatus responsive to received horizontal and vertical timing signals for generating receiver synchronizing signals comprising:
- means for generating periodic timing pulses,
  - means for phase-locking said generated timing pulses to said received horizontal timing signals,
- counter means comprising a predetermined number, N, of binary stages,
- means for applying said generated timing pulses to said counter means,
- means for simultaneously generating a vertical synchronizing signal and an auxiliary timing signal upon the simultaneous occurrence of a predetermined energy state in the N stages of said counter means,
- means for developing a control signal upon the occurrence of a received vertical timing signal,
- and means responsive to said control signal and said generated auxiliary timing signal for enabling said means for applying said generated timing pulses to said counter means upon the coincidence in time of a received vertical timing signal and said vertical synchronizing signal.

2. Apparatus as defined in claim 1 wherein said means for applying said generated timing pulses to said counter means comprises gating means connecting said means for generating periodic timing pulses and said counter means.

3. Apparatus as defined in claim 1 wherein said means for enabling said means for applying said generated timing pulses to said counter means comprises:
- a first transmission gate responsive to said control signal,
- a second transmission gate responsive to the output signals of said first transmission gate and said auxiliary timing signal,
- conductive means connecting the output of said second transmission gate to the input of said first transmission gate,
- and a third transmission gate responsive to the output signals of said second transmission gate and said auxiliary timing signal.

4. Apparatus responsive to received horizontal and vertical timing signals for generating video receiver synchronizing signals comprising:
- a source of periodic timing pulses,
- means responsive to said received horizontal timing signals for controlling the frequency of said timing pulses,
- counter means comprising a predetermined number, N, of binary stages,

- means for applying said timing pulses to said counter means,
- means for generating a first signal upon the simultaneous occurrence of a predetermined energy state in the N stages of said counter means,
- means responsive to said first signal for initiating simultaneously a vertical synchronizing pulse and an auxiliary timing signal,
- means responsive to said vertical synchronizing pulse for inhibiting the last $i$ stages of said counter means,
- means for developing a control signal upon the occurrence of a received vertical timing signal,
- means responsive to said control signal and said auxiliary timing signal for enabling said means for applying said timing pulses to said counter means upon the coincidence in time of a received vertical timing signal and said vertical synchronizing pulse,
- means for generating a second signal upon the simultaneous occurrence of a predetermined energy state in the first $N-i$ uninhibited stages of said counter means,
- means responsive to said second signal for terminating said vertical synchronizing pulse thereby simultaneously enabling said last $i$ stages of said counter means,
- means responsive to said second signal and said vertical synchronizing pulse for establishing a predetermined energy state in the N stages of said counter means upon the termination of said vertical synchronizing pulse,
- and means responsive to said periodic timing pulses for developing a train of horizontal synchronizing pulses.

5. Apparatus as defined in claim 4 wherein said means for controlling the frequency of said timing pulses comprises automatic phase control means for phase-locking said periodic timing pulses to said received horizontal timing signals.

6. Apparatus as defined in claim 4 wherein said means for applying said timing pulses to said counter means comprises gating means connecting said source of periodic timing pulses and said counter means.

7. Apparatus as defined in claim 4 wherein said means for enabling said means for applying said timing pulses to said counter means comprises:
- a first transmission gate responsive to said control signal,
- a second transmission gate responsive to the output signals of said first transmission gate and said auxiliary timing signal,
- conductive means connecting the output of said second transmission gate to the input of said first transmission gate,
- and a third transmission gate responsive to the output signals of said second transmission gate and said auxiliary timing signal.

8. Television apparatus responsive to received horizontal and vertical timing signals for generating receiver timing signals comprising:
- means for generating periodic timing pulses,
- counter means comprising a plurality of binary stages,
- means for applying said generated timing pulses to said counter means,
- means for generating a vertical timing signal upon the simultaneous occurrence of a predetermined energy state in the stages of said counter means,
- means for developing a control signal upon the appearance of a received vertical timing signal,
- and means responsive to said control signal and said generated vertical timing signal for enabling said means for applying said generated timing pulses to said counter means upon the coincidence in time of a received vertical timing signal and said vertical timing signal.

9. Apparatus responsive to received horizontal and vertical timing signals for generating video receiver synchronizing signals comprising:

means for generating a train of pulses, means responsive to said received horizontal timing signals for controlling the frequency of said train of pulses, counter means comprising a plurality of binary stages, means for applying said train of pulses to said counter means, means for generating a first signal upon the simultaneous occurrence of a predetermined energy state in the stages of said counter means, means responsive to said first signal for initiating a vertical synchronizing signal, means for developing an auxiliary timing signal upon the initiation of said vertical synchronizing signal, means responsive to said vertical synchronizing signal for inhibiting a predetermined number of the stages of said counter means, means for developing a control signal upon the reception of a vertical timing signal, means responsive to said control signal and said auxiliary timing signal for enabling said means for applying said train of pulses to said counter means upon the coincidence in time of a received vertical timing signal and said vertical synchronizing signal, means for generating a second signal upon the simultaneous occurrence of a predetermined energy state in the uninhibited stages of said counter means, means responsive to said second signal for terminating said vertical synchronizing signal thereby simultaneously enabling said inhibited stages of said counter means, and means responsive to said second signal and said vertical synchronizing signal for establishing a predetermined energy state in the stages of said counter means upon the termination of said vertical synchronizing signal.

References Cited

UNITED STATES PATENTS

| | | | |
|---|---|---|---|
| 3,420,956 | 1/1969 | Heightley et al. | 178—69.5 XR |
| 3,440,547 | 4/1969 | Houcke | 178—69.5 XR |

RICHARD MURRAY, Primary Examiner